United States Patent [19]
Ott

[11] 3,872,443
[45] Mar. 18, 1975

[54] INDIVIDUAL IDENTIFICATION APPARATUS AND METHOD USING FREQUENCY RESPONSE

[75] Inventor: James H. Ott, Akron, Ohio

[73] Assignee: Novar Electronics Corporation, Barberton, Ohio

[22] Filed: Jan. 26, 1973

[21] Appl. No.: 326,832

[52] U.S. Cl............. 340/172.5, 128/2 R, 181/.5 R, 340/1, 73/67.2
[51] Int. Cl............................................... G06f 1/00
[58] Field of Search.... 340/1, 15, 16, 172 S, 149 A, 340/146.3 Q, 15.5, 172.5, 149 R, 151 R, 258 R, 146.3 E; 128/2.1 Z, 2.1 R, 2 S, 2 R, 2 W, 2 ZV, 2.1; 73/67.7, 67.8, 67.8 S, 67.9, 67.2, 62.7, 69, 71.5; 235/181, 61.7 B; 324/57 R

[56] References Cited
UNITED STATES PATENTS

| | | | |
|---|---|---|---|
| 2,184,511 | 12/1939 | Bagno et al. | 128/2.1 Z |
| 3,085,566 | 4/1963 | Tolles | 128/2.1 Z |
| 3,177,347 | 4/1965 | Cowley | 324/57 R |
| 3,334,622 | 8/1967 | Brech | 128/2 N |
| 3,340,867 | 9/1967 | Kubicek et al. | 128/2.1 Z |
| 3,506,813 | 4/1970 | Trimble | 128/2.1 R |
| 3,622,784 | 11/1971 | DelGuercio | 128/2.1 R |
| 3,639,905 | 2/1972 | Yaida et al. | 340/149 A |
| 3,653,373 | 4/1972 | Batterman | 73/67.2 |
| 3,677,831 | 7/1972 | Pezaris et al. | 73/67.2 |
| R27,580 | 2/1973 | Rawson et al. | 340/172.5 |

*Primary Examiner*—Joseph M. Thesz, Jr.
*Attorney, Agent, or Firm*—Frank H. Foster

[57] ABSTRACT

An electronic apparatus and method suitable for automatic machine interrogation of individuals for identifying persons such as those seeking admittance to secure areas or seeking an extension of credit. Acoustical wave energy is applied by an oscillator and transducer to the person's body, such as one end of an arm. Another transducer contacts another body part, such as the other end of the arm, to receive the body-transmitted energy. The frequency response characteristics of the body part are then detected by suitable correlation means to determine the amplitude and phase transfer functions. Comparison of a previously known transfer function of a person with a subsequently measured transfer function permits a machine decision whether the functions represent the same person.

10 Claims, 2 Drawing Figures

INDIVIDUAL IDENTIFICATION APPARATUS AND METHOD USING FREQUENCY RESPONSE

BACKGROUND OF THE INVENTION

This invention relates to machine identification of persons and more particularly relates to a method and apparatus for computer measurement and analysis of the frequency characteristics of a portion of a person's body for automatically identifying that person.

The computer industry is presently engaged in developing systems for rapid, accurate and automatic computer identification of persons.

A typical use for such a system would be to automatically identify persons seeking admittance to a secure area in a plant or to sensitive data stored in a computer memory. For example, a person seeking sensitive data or admittance to a secure area would be interrogated by a computer to determine if he is a person authorized to have access to such area or data.

Similarly, machine identification would be used in credit transactions, such as is currently being planned for future use. In such a transaction, a person would not only present his credit card to a clerk, but in addition, would be subjected to machine identification for a determination that he is the person who owns the card being presented. Such a system can reduce the damage from credit card losses and theft.

Attempts to design a computer identification system have, to date, been directed toward voice print identification and toward finger print identification techniques. Signature identification has also been proposed. To date, however, none of these methods has become practically feasible.

I have discovered a method and apparatus for individual identification involving the application of sonic energy to a person's body and the subsequent detection of the frequency response of that part of the person's body. Persons can then be distinguished through the unique frequency response that an arm, for example, exhibits.

Others have applied sonic energy to a person's body. For example, sonic energy is applied to provide a "picture" of the internal condition of the body for medical purposes. Such systems apply sonic energy in a radar type system or in a holographic system. Although these systems apply sonic energy to the human body, this is their only similarity to the present invention. The prior art methods and apparatus for obtaining and for processing the received energy differs greatly from that used in the present invention. In the system of the present invention, a comparison is made of transfer characteristics. In these prior art systems, radar or sonar principles are used to obtain "pictures."

The automatic identification capabilities provided by frequency response identification will have unimaginable impact on many industries. For example, a computer will now be able to identify the person operating it so that only proper data will be accessible to this person. Compact locking devices may be programmed to admit only certan individuals. A computer can interrogate and identify a person over the telephone. For example, the identity of a salesman wanting computer data from a distant city in a motel through an acoustical coupler can be quickly and accurately verified. Credit cards and checks may contain a coding which would permit a quick identity verification at point of purchase with a simple machine. Automobiles can be programmed to operate for only specific individuals. Homes, apartments, or any secured property can be made accessible only to owners. Legal signatures can be obtained by telephone by permitting the frequency response identification to function as a legal signature.

Frequency response identification may also be adopted for use in the medical field. For example, a new means may be at hand which will provide a quick and simple check for bone aging, deterioration, disease, and the like. It is believed that various characteristics of the bones transfer function may be altered by bone condition, muscular tension, presence of fat, and other variable health conditions. It may even be possible to determine the emotional state or tension of the person whose identity has been established. This can be important where a person who is authorized to remove information from the computer might be nervous because he is intending to do this for illegitimate reasons or is under duress.

SUMMARY OF THE INVENTION

The invention is an apparatus and a method for identifying individual persons. The apparatus comprises a means for applying sinusoidal-wave energy to the body of a person. Received wave energy is electronically processed by suitable means for detecting the frequency response characteristics of the intermediate body portion. Data storing means are also connected to the detecting means for storing data representing an initial measurement of the frequency response for use in comparing a subsequently detected frequency response.

The method is performed by applying sinusoidal-wave energy to the body and using the applied energy to detect the frequency response characteristics of at least a portion of the body. Data representing said characteristics is stored and then subsequently sinusoidal-wave energy is applied to a person being identified. The frequency response characteristics of the subsequent person is detected and compared with the characteristics of the first person to determine if the identical person is represented.

Accordingly, it is an object of the invention to provide an identification method and apparatus suitable for automatic machine use.

Further objects and features of the invention will be apparent from the following specification and claims when considered in connection with the accompanying drawings illustrating several embodiments of the invention.

Figures 1, 2:
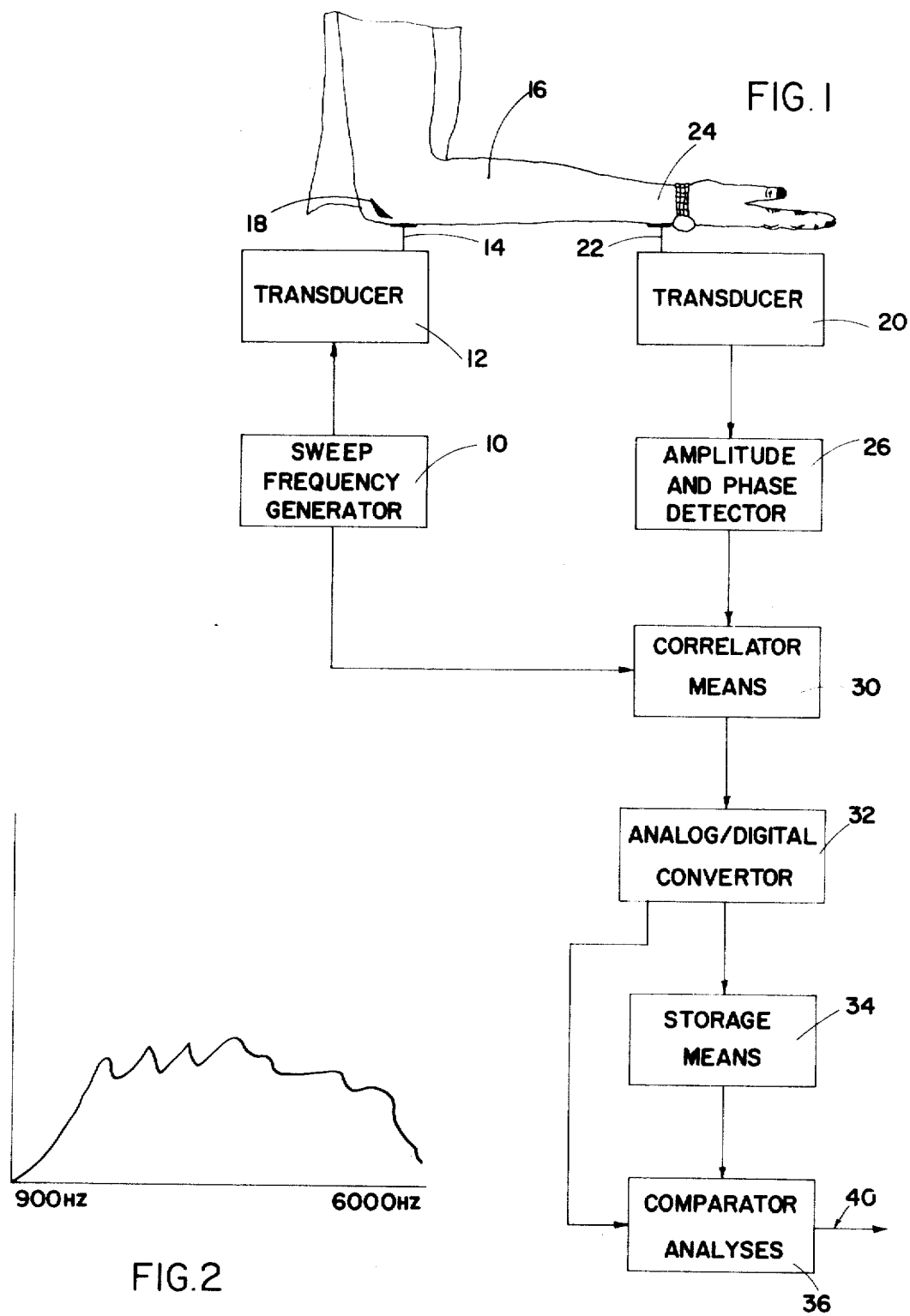
FIG. 1 is a block diagram illustrating the preferred embodiment of the invention.
FIG. 2 is a graph representing a hypothetical transfer function of an individual.

In describing the invention as illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, use of the word "connection" includes not only direct connection, but also connection through an intermediate circuit where such a connection is equivalent as known by those skilled in the art.

DETAILED DESCRIPTION

Referring to FIG. 1, a frequency generator 10 is used to generate the sonic frequency signal to be applied to the body of a person. Although various portions of the frequency spectrum may be useful, I believe that the sonic portion of the spectrum is most useful in the preferred embodiment of the invention. The preferred frequency generator 10 is a sweep frequency generator which periodically varys its output frequency from one end of a selected frequency range to the other end of the selected range. For example, Hz frequency generator might repeatedly sweep from 100 Hz, to 10 KHz over a suitable period. It might, for example, comprise an oscillator having a capacitance diode driven by a sawtooth signal in a conventional sweep frequency generator circuit.

Alternatively, of course, the generator 10 could be a generator providing discrete selectable frequencies spaced across a desired frequency range. The generator can then be sequentially switched from discrete frequency to discrete frequency in a periodic manner.

As another alternative, the frequency generator 10 can instead be a generator which has several output frequencies simultaneously generated at its output. Suitable filtering means can be provided in the detecting circuits to distinguish the transfer function at various frequencies.

In any case, the output of the frequency generator 10 is applied to a suitable transducer which preferably is in mechanical contact with the body of a person. For example, as illustrated, the output contact 14 of the transducer 12 contacts the ulna bone of a person 16 at his elbow 18. A transducer 12 of conventional design may be used and might be of the piezoelectric type, electromagnetic type, and so forth. For example, I have used a transducer of the radio-speaker type and positioned my elbow in contact with its paper cone.

Thus, the transducer 12 and the frequency generator 10 together provide a means for applying sinusoidal wave-energy to the body of a person. This wave energy is preferably sonic energy. Another electromechanical receiving transducer 20 is positioned with its contact portion 22 against another part of the person's body. As shown, in the preferred embodiment, the contact portion 22 of the transducer 20 is positioned in contact with the ulna bone at the opposite end of the forearm near the wrist 24. Thus, energy applied at the elbow 18 is transmitted through the forearm, primarily through the ulna bone and is received at the wrist 24 by the transducer 20.

The transducer 20, like the transducer 12 may be any of the well known electromechanical transducers which convert mechanical vibratory energy to an electronic signal. For example, I used a sensitive microphone positioned in contact with the ulna bone.

Amplitude and phase detectors 26 are connected to receive the output of the transducer 20. This detector 26 senses both the amplitude of the transmitted wave energy and also its phase relative to the input wave energy of the transducer 12.

The circuitry of the amplitude and phase detectors is not shown because they may be any of the well known variety of circuits used for detecting the amplitude and phase of wave energy. For example, amplitude is often detected by the conventional diode and capacitor circuit used in a diode detector of an amplitude modulated radio receiver. Similarly, phase detectors are likewise well known and may easily be adapted for use in the present invention by a person skilled in the art.

The detected amplitude and phase from the detector 26 is then applied to a correlator means 30. The correlator means 30 preferably functions to process the incoming signal to provide an output representing a transfer function of the portion of the body through which the wave energy was transmitted. The transfer function is the algebraic-trigono-metric statement of the output divided by the input. In the preferred embodiment, the function of the correlator means 30 is to compute the transfer function of the forearm 16.

For example, if the wave energy applied by the transducer 12 is maintained at a constant amplitude and phase, the correlator means might comprise a pair of $x-y$ plotters. The $x$ input of each would be a time varying voltage proportional to the frequency of the frequency generator 10. For example, the sawtooth driving the sweep frequency generator 10 could be applied to the $x$ drivers of both $x-y$ plotters. The $y$ input for one plotter would be the detected amplitude output of the amplitude and phase detector 26. The $y$ input of the other plotter would be the detected phase output of the amplitude and phase detector 26. In this manner, visual, graphical readouts of the transfer function would be automatically provided by the correlator means.

Alternatively, the correlator means can periodically sample the output amplitude and phase and record it digitally as a function of frequency. It should also be noted that it may be desirable to have the correlator means determine only the phase or only the amplitude part of the transfer function. A typical output from the correlator means 30 is illustrated in FIG. 2 as a bode plot.

If the amplitude or phase of the input frequency is varied, or if improved accuracy is desired, the output signal may be applied from the sweep frequency generator 10 to the correlator means 30 for comparison by the correlator means 30 with the output from the amplitude and phase detector 26. The transfer function would be continuously computed by the correlator means by comparing the output signal to the input signal at all times.

In an alternative embodiment where the transfer function is not computed, the portion of a person's body can be considered as a terminating load rather than as a transmitting medium. In such a system, both transducers would be positioned at the identical point of in the alternative, a single transducer would be utilized and the amplitude and phase detector 26 would be solely an amplitude detector and would be connected to the input of the single transducer. The frequency response would then be detected in a manner analogous to the detection of the frequency response of a tuned circuit. As the sweeping generator sweeps through the frequency range, the forearm, for example, of the individual would exhibit peaks of relative resonance. These peaks can be used to detect the individual characteristics of a person.

Returning however, to the preferred embodiment of FIG. 1, the output of the correlator means 30 may be applied to an analog to digital converter 32 and then stored in a suitable storage means 34. The storage means 34 can be any of the multitude of storage systems currently available for data processing. For example, the data representing the transfer function of a person being initially detected would be stored in the storage means 34 and identified as being that of a person who is permitted access to sensitive computer data. At a subsequent time when the person seeks access to the data, the output of the analog/digital converter 32 would be applied to a comparator analysis circuit 36. The comparator analysis circuit 36 simultaneously receives from the storage means 34, the transfer function of the individual stored therein. The stored information can be withdrawn from the memory by a person's name or the computer can scan all stored transfer functions. The subsequently measured transfer function and the previously stored transfer function are compared by the comparator circuit to determine if they represent the same person.

Of course, the comparator analysis circuit 36 could include a pair of x-y plotters on which the subsequently measured transfer function is printed together with the previously stored transfer function for visual analysis and comparison by a person.

Preferably however, the circuit compares the two automatically and may be programmed to reject the person as not being of the proper identity if the transfer function is not within preselected tolerances. The comparator analysis circuit 36 electronically compares the magnitude of the amplitude deviations and the magnitude of the phase deviations of the subsequently measured transfer function from the transfer function stored in the storage means 34. Such comparisons may occur throughout the entire frequency range for which the transfer function was measured or can be accomplished at selected discrete frequencies. The comparator circuit may, for example, include a pair of differential amplifiers, one for detecting the difference in phase and the other for detecting the difference in amplitude between the stored transfer function and the subsequently detected transfer function.

In operating the circuitry illustrated in FIG. 1, a person's arm is positioned to extend from the transducer 12 to the transducer 20. The circuit is activated and energy generated by the sweep frequency generator 10 is applied to the arm by the transducer 12 and transferred along the forearm 16 to the transducer 20. The transducer 20 converts the mechanical signal to an electronic signal and the amplitude and phase of the received signal are detected by the amplitude and phase detector 26. Thus, the preferred output of the amplitude and phase detector 26 is a pair of electronic signals, the amplitude of which are representative of the amplitude and of the phase of the output signal at the transducer 20.

The detected amplitude and phase signals are applied to a correlator means 30 which in effect correlates the output amplitude and phase as a function of frequency. Thus, the output of the correlator means 30 is representative of the transfer function of the forearm 16. This may be converted to digital data if desired by analog/digital converter 32 and when appropriate, such as when making initial measurements, is then stored in a suitable storage means 34. The transfer function data may, however, always be stored in a storage means for later identifying persons who sought access to data even when such persons are subsequently rejected.

Data from the storage means 34 which is representative of previously measured transfer functions and subsequently measured data directly from the analog/digital converter 32 are applied to the comparator analysis circuit 36 where the two transfer functions are compared to determine whether the same person is present at the transducers 12 and 20. Further computing and decision making computation circuitry may be connected to the output 40 of the comparator analysis circuit 36. Such circuitry would be programmed with the criteria for accepting or rejecting a person and for suitable means for responding to or signalling an acceptance or rejection.

It may be found that a person's unique transfer function may have a unique shape but may also shift upwardly or downwardly in the frequency spectrum as a result of aging or other factors. Thus, computing circuitry may be added to shift one of the computed transfer functions being compared, up or down to seek a point of minimum deviation. Then comparison is made to accept or reject a person's identity.

It is to be understood that while the detailed drawings and specific examples given describe the preferred embodiments of the invention, they are for the purposes of illustration only, that the apparatus of the invention as well as the method is not limited to the precise details and conditions disclosed and that various changes may be made therein without departing from the spirit of the invention which is defined by the following claims.

I claim:

1. A method for comparing a subsequently interrogated person to a previously interrogated person as an aid in identifying individual persons, the method comprising:
   a. applying sinusoidal physical vibration sonic wave energy to the human body of a first person;
   b. detecting frequency response characteristics of at least a portion of said human body of said first person by detecting the frequency response of at least said portion to said applied wave energy;
   c. storing data representing said characteristics;
   d. subsequently applying sinusoidal physical vibration sonic wave energy to the human body of a subsequent person;
   e. detecting frequency response characteristics of the body of said subsequent person by detecting the frequency response of at least said portion to said applied wave energy; and
   f. comparing said characteristics of said first person with said characteristics of said subsequent person to determine whether said characteristics are within preselected tolerances of each other
   wherein the frequency response characteristics which are detected comprise a transfer function between corresponding body parts of each said body.

2. A method according to claim 1 wherein both the amplitude and phase shift portions of the transfer function are detected.

3. A method according to claim 2 wherein said wave energy is sonic energy and said energy is applied and detected at body parts having bones near the body exterior.

4. An apparatus for use in comparing a subsequently interrogated person to a previously interrogated person as an aid in identifying individual persons, said apparatus comprising:
   a. an audio oscillator having means for varying the oscillation frequency of said oscillator;

b. an electromechanical transmitting, transducer connected to be driven by oscillations generated by said audio oscillator, said transmitting transducer being positioned to apply its output vibratory oscillations to the body of a person;

c. an electromechanical receiving transducer positioned to receive vibratory oscillations from the body of said person generated by said transmitting transducer and to convert said vibratory oscillations to corresponding electronic oscillations;

d. correlation means connected to receive the output of said receiving transducer for providing an output representing a transfer function of said body from said transmitting transducer to said receiving transducer as a function of applied frequency said correlation means comprising:

an amplitude detector connected to the output of said receiving transducer, a frequency related signal means connected to said audio oscillator, and data storage means connected to the amplitude detector and to the frequency signal means for storing the output of the amplitude detector as a function of applied frequency; and e. a comparator means connected to said data storage means for comparing a subsequently stored output in said data storage means to a previously stored output in said data storage means to determine the difference between said stored outputs and for comparing said difference to a preselected tolerance and signal whether said difference is within the preselected tolerance.

5. An apparatus according to claim 4 wherein said data storage means is an $x-y$ plotter.

6. An apparatus according to claim 4 wherein said data storage means comprises means for sampling the output of said amplitude detector at selected frequency intervals and means for storing data representing the sampled amplitudes.

7. An apparatus for use in comparing a subsequently interrogated person to a previously interrogated person as an aid in identifying individual persons, said apparatus comprising:

a. an audio oscillator having means for varying the oscillation frequency of said oscillator;

b. an electromechanical transmitting, transducer connected to be driven by oscillations generated by said audio oscillator, said transmitting transducer being positioned to apply its output vibratory oscillations to the body of a person;

c. an electromechanical receiving transducer positioned to receive vibratory oscillations from the body of said person generated by said transmitting transducer and to convert said vibratory oscillations to corresponding electronic oscillations;

d. correlation means connected to receive the output of said receiving transducer for providing an output representing a transfer function of said body from said transmitting transducer to said receiving transducer as a function of applied frequency said correlation means comprising:

a phase detector connected to the output of said receiving transducer, a frequency related signal means connected to said audio oscillator, and data storage means connected to the phase detector and to the frequency signal means for storing the output of the phase detector as a function of applied frequency; and e. a comparator means connected to said data storage means for comparing a subsequently stored output in said data storage means to a previously stored output in said data storage means to determine the difference between said stored outputs and for comparing said difference to a preselected tolerance and signal whether said difference is within the preselected tolerance.

8. An apparatus according to claim 7 wherein said data storage means is an $x-y$ plotter.

9. An apparatus according to claim 7 wherein said data storage means comprises means for sampling the output of said phase detector at selected frequency intervals and means for storing data representing the sampled phases.

10. An apparatus according to claim 7 wherein said correlation means comprises:

a. an amplitude detector connected to the output of said receiving transducer;

b. a phase detector connected to the output of said receiving transducer;

c. a frequency related signal means connected to said audio oscillator; and d. data storage means connected to the amplitude detector and to the phase detector for storing selected output of the amplitude detector as a function of applied frequency.

* * * * *